UNITED STATES PATENT OFFICE.

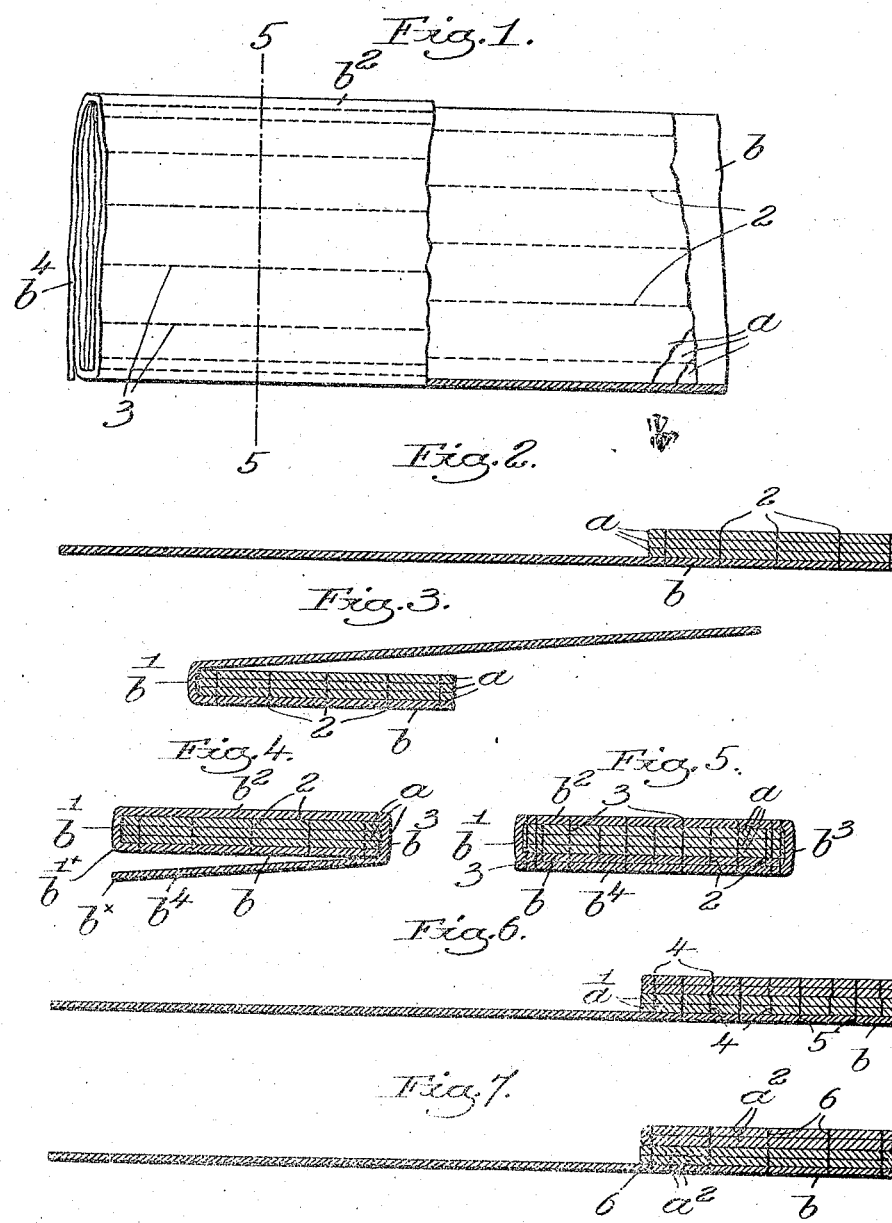
W. H. ADAMS.
BELTING.
APPLICATION FILED MAR. 23, 1909.
924,213.
Patented June 8, 1909.

WILLIAM H. ADAMS, OF LAWRENCE, MASSACHUSETTS, ASSIGNOR TO WILLIAM L. BARRELL, OF LAWRENCE, MASSACHUSETTS.

BELTING.

No. 924,213.   Specification of Letters Patent.   Patented June 5, 1909.

Application filed March 23, 1909. Serial No. 485,254.

*To all whom it may concern:*

Be it known that I, WILLIAM H. ADAMS, a citizen of the United States, and resident of Lawrence, county of Essex, Sta'e of Massachusetts, have invented an Improvement in Belting, of which the following description, in connection with the accompanying drawing, is a specification, like characters on the drawing representing like parts.
This invention has for its object the production of novel belting for use in transmitting power, belt-conveyers or elevators, etc., the belting constructed in accordance with my present invention possessing great strength, increased resistance to wear and tear, and requisite flexibility, while owing to the character of its structure it can be readily manufactured.

In laminated belting as ordinarily made the stitching or other fastening means employed to hold together the component layers, plies or laminæ of preferably textile material is exposed to constant and extensive wear, moisture and atmospheric action, and quickly becomes impaired. So, too, the arrangement of the component plies is such that they afford each other little or no material support when this impairment of the stitching or fastening means occurs, and moreover the method of construction commonly employed leaves exterior openings or joints between the different layers or plies of material of which the completed structure is composed. These exposed openings or joints admit moisture, dust and grit, thereby diminishing the life of the belt and greatly decreasing its efficiency. The necessity of using stitches (the common form of fastening) which pass through the entire thickness of the belt results in necessarily long interlocked stitches which are much weaker and less flexible and durable than shorter ones.

In my present invention I obtain a very intimate relation between the several plies of material, preferably canvas, of which the belting is composed, and I obviate the objectionable exposed openings or joints between the plies, hereinbefore referred to.

In accordance with my invention the body or filler of the belting, composed of one or more plies of the desired material of substantially the width of the belting, is fastened securely to a much wider strip of covering material adjacent one longitudinal edge thereof, and such covering strip is folded over upon the exposed face of the body or filler and carried around its edge and laid upon the outer face of that portion of itself (the covering strip) which has been previously fastened to the body or filler. The whole is then secured together by rows of fastenings extended completely through all of the superposed plies or layers of fabric, so that each longitudinal edge of the body or filler is covered and protected by the overlying portion of the cover.

The various novel features of my invention will be fully described in the subjoined specification and particularly pointed out in the following claims.

Figure 1 is a plan view of a piece of laminated belting embodying my invention, the cover being partly broken out to show the body or filler, the latter being shown as made up of a plurality of superposed plies; Fig. 2 is a cross section of the belting in process of manufacture, showing the body or filler plies, fastened together and to the cover ply of slightly more than three times the width of the belt; Fig. 3 is a similar view, but showing the cover as carried up around one edge of the body or filler and about to be laid upon the exposed face thereof; Fig. 4 is a cross section of the belting, after the cover has been carried around both edges of the body or filler, across the exposed face thereof, and then folded upon itself beneath the body, ready for the final fastening operation; Fig. 5 is a cross section of the finished belting, taken on the line 5—5, Fig. 1; Figs. 6 and 7 are cross sectional views showing modified forms of body or filler, to be referred to, secured to the cover ply in readiness to have the latter folded or rolled around the body.

In the sectional views the plies composing the body or filler and the cover ply, or cover, are shown as separated from each other in order to more clearly illustrate the construction.

To make the belting shown in Figs. 1 to 5, I provide a suitable number of plies *a*, three being shown, of suitable material, such as canvas, of the requisite length and of approximately the width of the finished belting, said plies being superposed one upon another to form the body or filler, and they are firmly secured, as by parallel rows of stitching 2, to a wider strip or ply *b* which is to form the cover of the belting. The body plies are so disposed upon the cover that one longitudinal edge of the body or filler registers or will lie above an edge of the cover, as clearly shown in Fig. 2. The said cover $b$ is slightly more than three times the width of the finished belting, that is, it is three times the finished width plus twice the thickness of the body or filler, making proper allowance for any stretching transversely in the cover. After the body and cover plies have been fastened together, as in Fig. 2, the free portion of the cover is drawn up around the edge of the body, at $b'$, Fig. 3, folded over upon the exposed face of the body at $b^2$, Fig. 4, and carried around the uncovered edge thereof at $b^3$ and then laid upon the exposed face of that portion of itself which is fastened to the body, as at $b^4$, Fig. 4. Thus the fastenings 2 are effectually covered and protected by the material of the cover ply, and so too the juxtaposed edges of the superposed plies $a$ forming the body or filler are inclosed, concealed and protected by the portions $b'$, $b^3$ of the cover, and the position and connection of the cover with relation to the body plies $a$ cause it to share and uniformly distribute all strains to which said plies may be subjected in the finished belting. The wide or cover ply $b$, after the folding or rolling around the body as described, and as shown in Fig. 4, is now ready to be fastened to the body, and the cover is pulled tightly around the body to bring its free edge $b^x$ approximately into position at the adjacent edge of the belting, indicated at $b'^x$, Fig. 4.

The stitching which is to complete the belting is started at the left hand edge of the same, viewing Fig. 4, so that as the longitudinal rows of through and through stitching 3, Fig. 5, approach the right hand edge of the belting, the various superposed plies will be flattened out and there will be no welts or ribs present, but the finished belting will lie flat and smooth.

The parallel rows of stitches 3 securely bind the previously fastened inner or body plies $a$ to the wider cover ply $b$, as will be manifest, and it will be seen that the primary fastenings 2 are completely covered and protected by the overlying portions $b^2$, $b^4$ of the cover.

As the cover ply is folded over to present three layers I term it a three-fold cover ply, the body or filler being fastened to the primary fold and being covered by the secondary fold $b^2$, while the final fold $b^4$ is superimposed or laid upon the outer face of the primary fold. This cover ply when folded over as described forms a species of flat tube having a single thickness at one side of the body and a double thickness at the opposite side, but the initial fastenings which secure the body to the cover-ply are protected by the secondary and final folds, as will be apparent from the foregoing description.

I have shown the body or filler as composed of three plies of material, Figs. 1 to 5, for convenience in illustration, but it will be understood that the number of such plies may be increased or decreased according to circumstances without changing in any way the scope of my invention.

Referring to Fig. 6, I have shown the body plies $a'$ fastened together in pairs by lines of fastenings 4, and the double-plies thus formed are secured to the cover-ply $b$ by fastenings 5, substantially as hereinbefore described, said cover-ply being thereafter folded over and secured in the manner described.

In Fig. 7 each body ply $a^2$, is shown as folded upon itself, so that these plies will be, before folding, substantially twice the width of the finished belting, and the folded plies are superposed in reversed order, that is, with the folded edge of one adjacent the free edges of the next double-ply, and the body-plies are secured by lines of fastenings 6 to the cover-ply $b$ as before.

Whichever mode be adopted a structure is built up which contains no opening or joint for the admission of dirt or moisture, and in which the various superposed plies are relatively so securely interconnected and fastened or bound together that each ply acts to support the others, and thus the belting is not wholly dependent for its usefulness upon the integrity of the outer or through and through fastening means. Consequently a considerable impairment of the covering and of the exposed fastening means may take place before the interior fastening means is affected sufficiently to permit separation of the belting into its component plies. My novel construction also permits the exterior or cover of the belting to be made of a fabric better adapted to withstand attrition and wear than that used for the interior or body-plies.

Various changes or modifications in details of construction and arrangement may be made by those skilled in the art without departing from the spirit and scope of my invention as set forth in the annexed claims.

Having fully described my invention, what I claim as new and desire to secure by Letters Patent is:—

1. Laminated belting consisting of a three-fold cover, a body or filler initially fastened to the primary fold thereof and inclosed between the primary and secondary folds, the final fold being superposed upon the primary fold, and fastening means uniting the body and the several folds of the cover, the initial fastening being covered and protected by the secondary and final folds of the cover.

2. Laminated belting consisting of a three-fold cover-ply, the several folds substantially the width of the belting, a body or filler of like width initially fastened to the primary fold and inclosed between it and the secondary fold of the cover-ply, the final fold thereof overlying the primary fold, and fastening means uniting the body and the several folds of the cover-ply.

3. Laminated belting consisting of a three-fold cover-ply, a body composed of a plurality of superposed plies of textile material, fastenings connecting said body plies to each other and to the primary fold of the cover-ply, the secondary fold thereof overlying the exposed face of the body and the final fold being superposed upon the primary fold, and rows of fastenings extended through and firmly uniting the body plies and the several folds of the cover-ply.

4. In a laminated belting, the combination of a cover-ply slightly more than three times the width of the finished belting, superposed and connected body plies substantially the width of the belting, initial fastenings between said body plies and the cover-ply, the latter being folded around the body plies and superposed upon the portion of its own fabric fastened to said body plies, and final fastenings uniting the body plies and the several folds of the cover-ply.

5. Laminated belting consisting of a three-fold cover of textile material, a plurality of narrower body plies of textile material superposed upon each other and upon the primary fold of the cover, longitudinal rows of stitching uniting the body plies and such primary fold, the secondary fold covering the face of the body plies and the final fold of the cover overlying the primary fold thereof, and longitudinal rows of stitching passing through and uniting all of the body plies and the several folds of the cover, the portions of the latter between and connecting the several folds thereof inclosing the juxtaposed longitudinal edges of the body plies.

6. Laminated belting consisting of a narrow body or filler of textile fabric, a cover-ply of textile fabric of slightly more than three times the width of the body, fastenings connecting the body or filler and the cover-ply with a longitudinal edge of one adjacent a longitudinal edge of the other, the cover-ply being folded continuously around the body or filler, and means to fasten together the body and the cover-ply folded around it.

7. Laminated belting consisting of a cover of textile material folded to form a flattened tube one side of which is single and the other side double, a body composed of a plurality of superposed plies of textile material inclosed between the single side of the cover tube and the inner member of the double side thereof, fastenings connecting the body plies and said inner member, and independent fastenings passing through the single and double sides of the cover tube and the contained body plies.

8. Laminated belting consisting of a triple-folded cover strip of canvas, a plurality of superposed body plies of canvas substantially the width of the finished belting, inclosed between the primary and secondary folds of the cover strip, longitudinal rows of stitching connecting the body plies and the primary fold and inclosed and protected by the secondary fold, the final fold of the cover strip lying upon the outer face of the primary fold and protecting the said rows of stitching, and longitudinal rows of stitching passing through the several folds of the cover strip and the body plies and fastening all of said parts securely together.

In testimony whereof, I have signed my name to this specification, in the presence of two subscribing witnesses.

WILLIAM H. ADAMS.

Witnesses:
J. P. SULLIVAN,
PETER A. MCENEANY.